Figure 4:
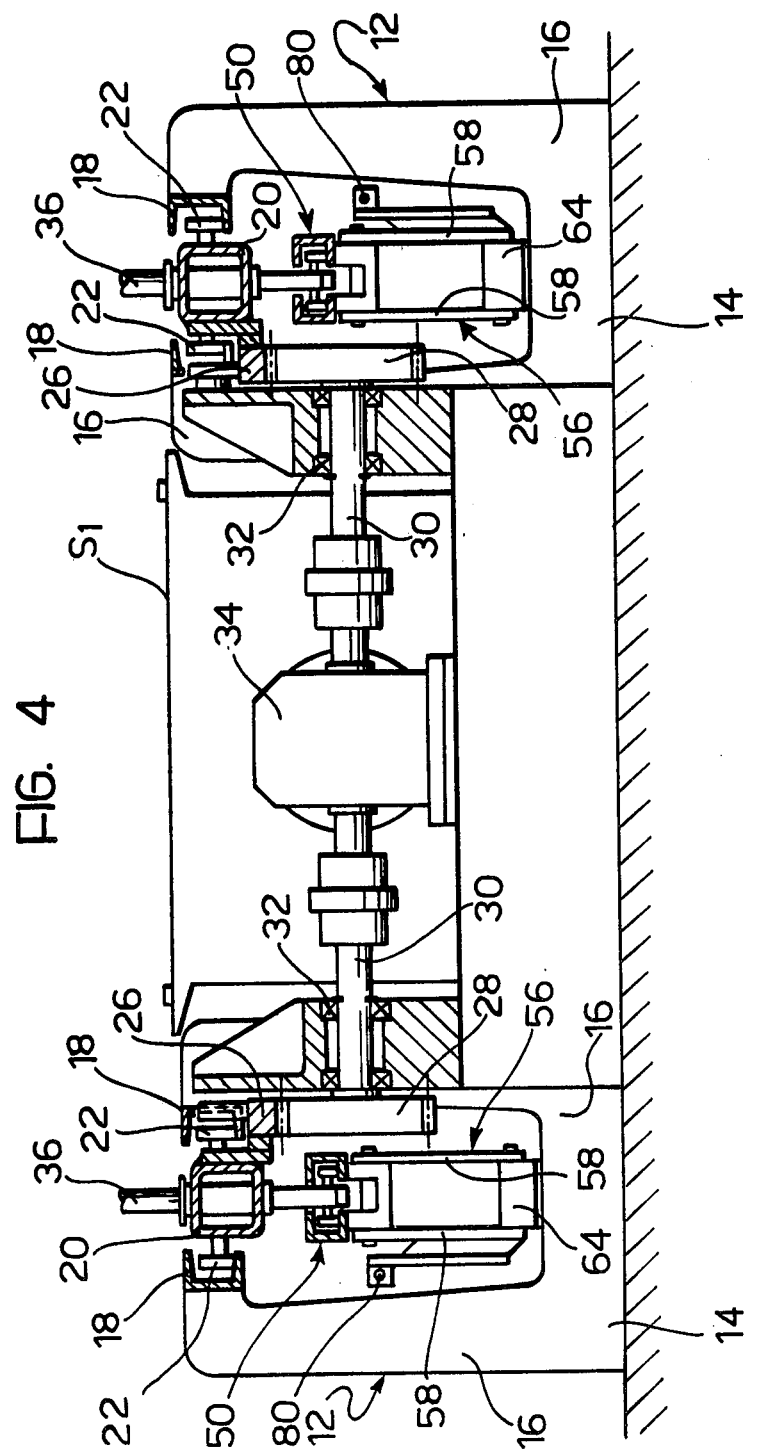

United States Patent [19]

Di Rosa

[11] Patent Number: 4,479,576
[45] Date of Patent: Oct. 30, 1984

[54] TRANSLATOR-BAR CONVEYOR INSTALLATION

[75] Inventor: Gaetano Di Rosa, Pino Torinese, Italy

[73] Assignee: FATA European Group S.p.A., Turin, Italy

[21] Appl. No.: 373,303

[22] Filed: Apr. 29, 1982

[30] Foreign Application Priority Data

May 11, 1981 [IT] Italy ............................... 67632 A/81

[51] Int. Cl.³ .............................................. B65G 25/00
[52] U.S. Cl. .................................................... 198/774
[58] Field of Search ............... 198/345, 472, 648, 478, 198/802, 774, 488, 621; 104/165, 127; 105/29 R

[56] References Cited

U.S. PATENT DOCUMENTS

| | | | |
|---|---|---|---|
| 2,416,763 | 7/1944 | Lynch | 198/774 |
| 3,455,433 | 11/1967 | Gentry | 198/774 |
| 4,198,845 | 4/1980 | Sofy | 198/621 |
| 4,360,097 | 11/1982 | Brems | 198/345 |
| 4,407,404 | 10/1983 | Rise et al. | 198/774 |

Primary Examiner—Joseph E. Valenza
Assistant Examiner—Kyle E. Shane
Attorney, Agent, or Firm—Sughrue, Mion, Zinn, Macpeak & Seas

[57] ABSTRACT

A conveyor installation for the displacement of components along an assembly line, which includes a series of consecutive work stations, comprises a pair of horizontal translator bars which extend laterally along the assembly line and are reciprocally movable, and a series of spaced support units carried by the bars and movable relative thereto, and thus relative to the work stations of the assembly line, between a lowered position and a raised position. Actuator means are provided to control the simultaneous displacement of the supports between a lowered position and a raised position to permit respectively the setting down of the components at the stations and the transfer of these components, on completion of the operations, to the consecutive stations in the assembly line, by means of the translator bars.

7 Claims, 6 Drawing Figures

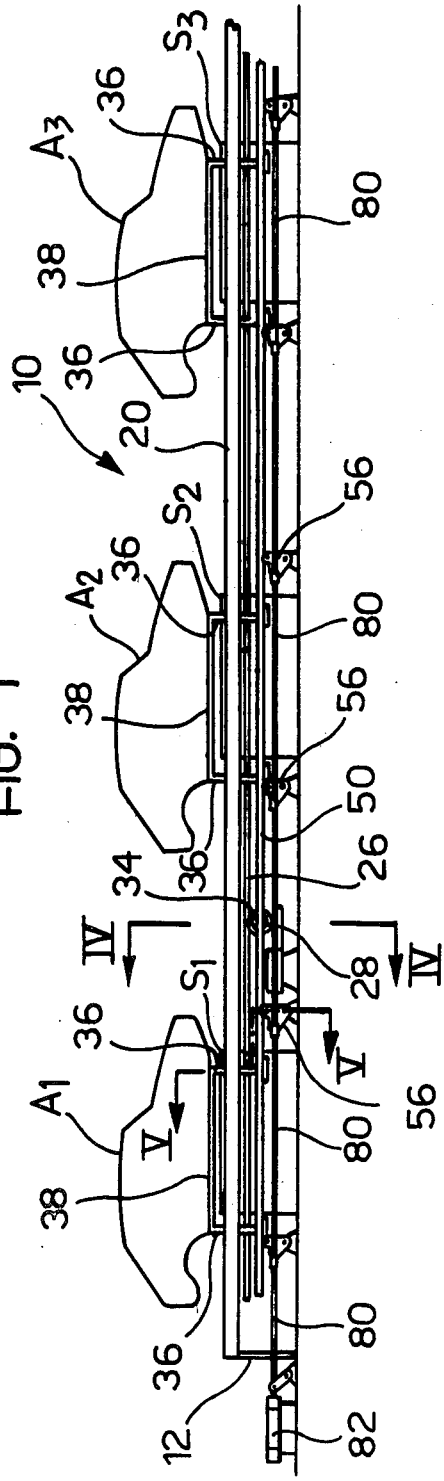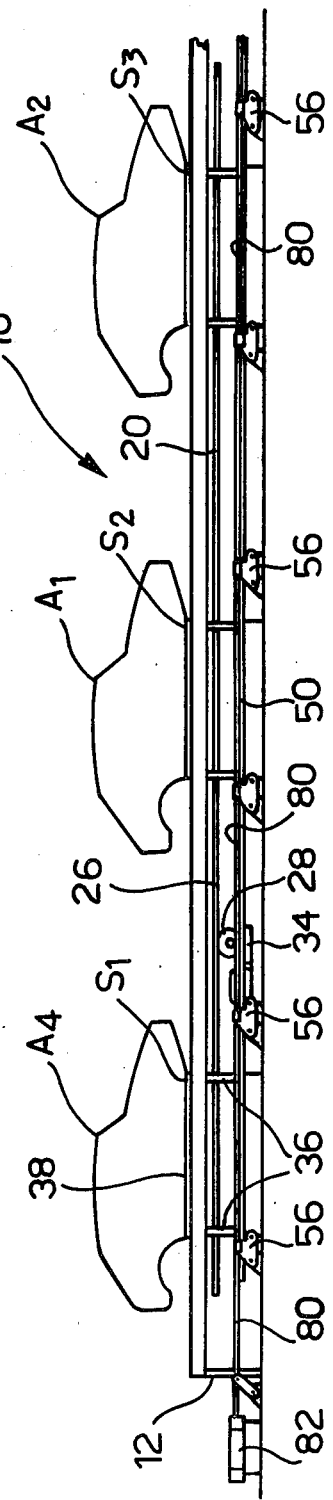

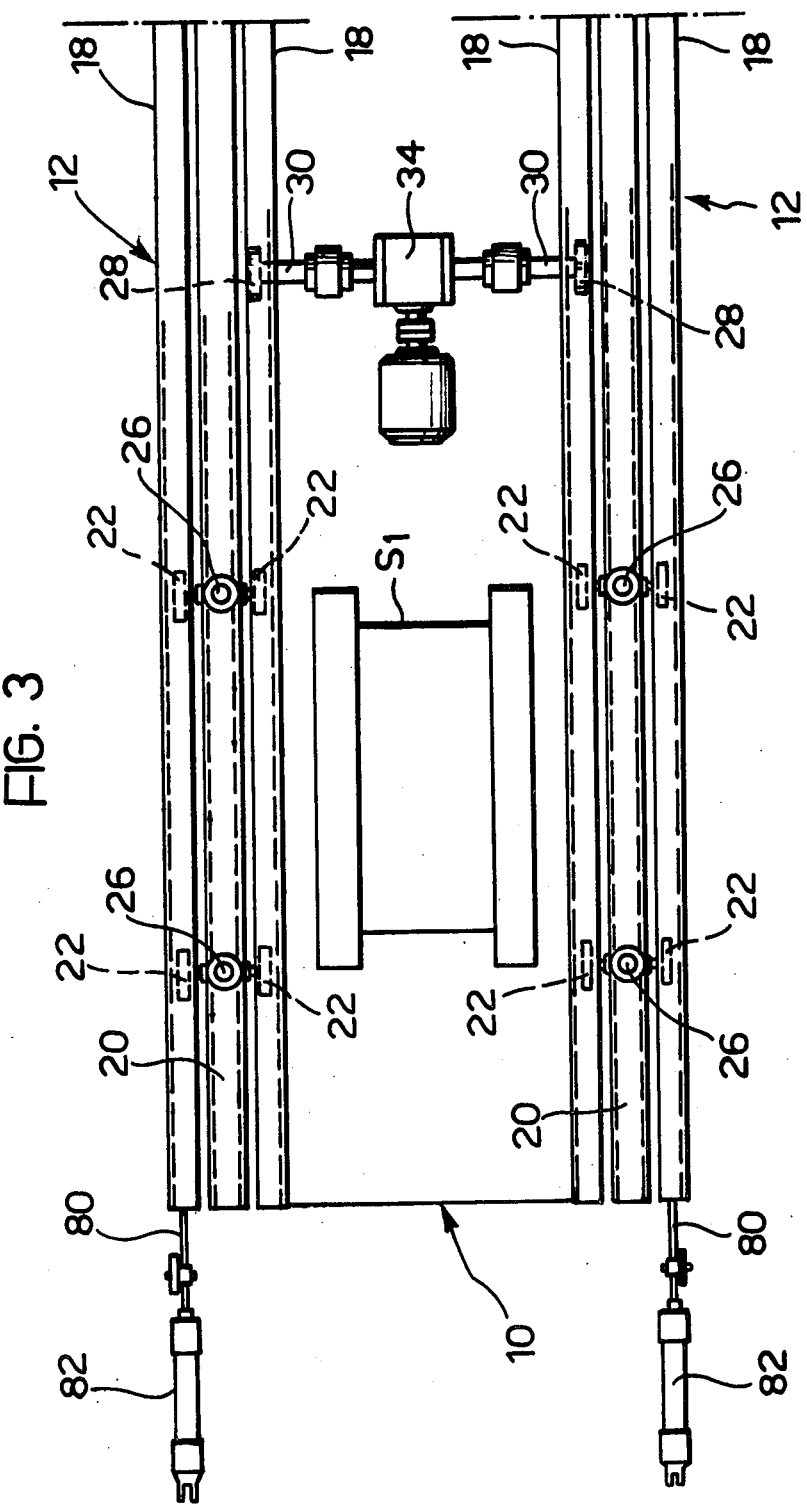

TRANSLATOR-BAR CONVEYOR INSTALLATION

The present invention relates generally to conveyor installations for displacing components, in particular motor vehicle components, along an assembly line which includes a series of spaced work stations. Installations of this kind are widely used, for example, in the motor vehicle industry for the assembly of motor vehicle bodies and chassis.

A first known type of conveyor installation comprises a sequence of supports in the form of pallets which may be provided with wheels and are drawn along an upper track by means of a reciprocally movable conveyor bar. The bar is provided with a coupling system which engages the pallets during its forward stroke and thus causes a translatory movement in the whole train of pallets corresponding to the distance between one station and the next. When the forward translatory movement has been completed, the pallets are locked in correspondence with the work stations by a system of latches. The conveyor bar then disengages the pallets themselves and is returned to its starting position pending repetition of the cycle. On reaching the last work station the pallets are lowered onto a lower track where they are coupled to a second movement system which in turn takes them onto the upper track, in correspondence with the first work station.

The components to be assembled, in the present case, motor vehicle bodies, are loaded onto the installation in correspondence with the first station and held fast by fixtures carried on the pallets so that they move forward with the latter until the final work station is reached. Mounting and assembly operations relating to the various components are carried out during the halts at the various stations disposed along the line.

Installations of this type have the drawback of considerable mechanical complexity, mainly arising from:

(a) a higher number of fitted pallets or trolleys which must be completely identical to one another, (b) the presence of lifting and lowering units for the fitted trolleys so that they may pass from the higher to the lower track, (c) the presence of two tracks (upper and lower) with two corresponding movement systems, (d) the need for high acceleration and deceleration values during each transfer cycle and the resultant need to use high capacity and large size motors and reduction gears.

A second known type of conveyor comprises a series of work stations which incorporate fixtures for holding fast the components whilst they are being worked upon. The fixed equipment of the stations is on both sides of the assembly line, leaving a central corridor free for a movable train made up of trolleys rigidly connected to one another and each provided with a lifting system for the load conveyed thereby. The whole trolley train is arranged to effect a back and forth movement and the displacement of the components from one station to the next is brought about by causing the whole train to effect a translatory movement step after it has raised the components away from the stations by means of the lifting devices of the trolleys. At the end of the stroke the components are set down on the next station. During the work periods at the stations, the trolley train returns to its starting position, with the lifting devices in their lowered positions.

This solution has the following drawbacks:

(a) the very large dimensions of the moving members of the equipment, (b) the need for the movable trolleys to carry an electric or hydraulic supply for their lifting devices, (c) the need to keep the components, in correspondence with the work stations, at the sides of the tracks since its central area is taken up with the translation system. This drawback is particularly serious in the case of motor vehicle body assembly lines, and particularly at stations where connections are made between sides and mudguards, owing to the difficulties which arise when welding equipment is introduced.

A third known type of conveyor requires the use of a pair of translator bars set parallel to, and on the outside of, the tools carried by the work stations along the line. The two bars are longitudinally movable by an amount of a step corresponding to the distance between two consecutive stations, the stations themselves being vertically movable between a lowered transfer position and a raised working position. In fact, upon completion of a work cycle, the stations are taken to the lowered position where they deposit the components on suitable supports carried by the bars and take up positions beneath the displacement path of the components themselves. When the stations have completed their descent, the bars carrying the components are advanced one step. At this point the stations rise again, lift the components from the supports of the bars, and take up their raised work position again. The return stroke of the bars is effected during the work cycle at the stations.

This solution has the drawback of considerable complexity arising from the need to displace the work stations, thus requiring the use of considerable installed power since the weight of the vertically movable members is substantial and their movement must be effected in a short space of time. Moreover, when adopting this solution it is particularly difficult to achieve an accurate adjustment of the lift stroke of the stations.

The present invention seeks to avoid the drawbacks of the three known solutions described above.

The present invention achieves this object with a conveyor installation for displacing components, particularly but not exclusively motor vehicle components, along an assembly line which includes a series of spaced work stations, of the type comprising a pair of horizontal bars for effecting translatory movement of the components, which extend laterally along the assembly line and are jointly reciprocally movable parallel thereto with a stroke equal to the interval between each pair of adjacent work stations, whereby to transfer each component from one station to the next, and means for approaching and separating the components carried by the bars, towards and from the work stations respectively at the end of and prior to, the forward stroke of these translator bars, characterised in that the said means for approaching and separating the components towards and from the work stations comprise a series of spaced support units carried on the two translator bars and arranged to bear the components, these supports being movable relative to the bars, and therefore relative to the work stations of the assembly line, between a lowered position and a raised position, and actuator means for effecting the simultaneous displacement of these supports between a lowered position and a raised position to enable respectively the setting down of the components in correspondence with the stations and the transfer of these components, at the end of an operation, to the successive stations of the assembly line by means of the two translator bars.

Thanks to this solution, there is achieved a number of important advantages, amongst which may be mentioned:

(a) considerable simplicity of manufacture and maintenance in that the installation is merely fulfilling a transfer function and does not therefore require such constructional precision as is typical of systems where work is carried out on units which also fulfil transfer functions, (b) the moving masses are relatively limited, with resultant reduction in installed power, (c) the possibility of keeping components within the central area of the assembly line thereby freeing the side areas so that, in the case of motor vehicle body assembly lines specifically, welded connections between sides and mudguards may be facilitated, (d) elimination of problems related to displacement of the work stations, since these are fixed, (e) appreciable reduction in the transverse dimensions of the installation.

According to the invention, the said supports are formed by vertical columns mounted for axial sliding between a raised position and a lowered position in corresponding guide passages of the translator bars, the actuator means operating on a pair of vertically-movable, horizontal, supporting and guiding structures which extend beneath the translator bars and are slidingly engaged by the said columns.

Figure 5:
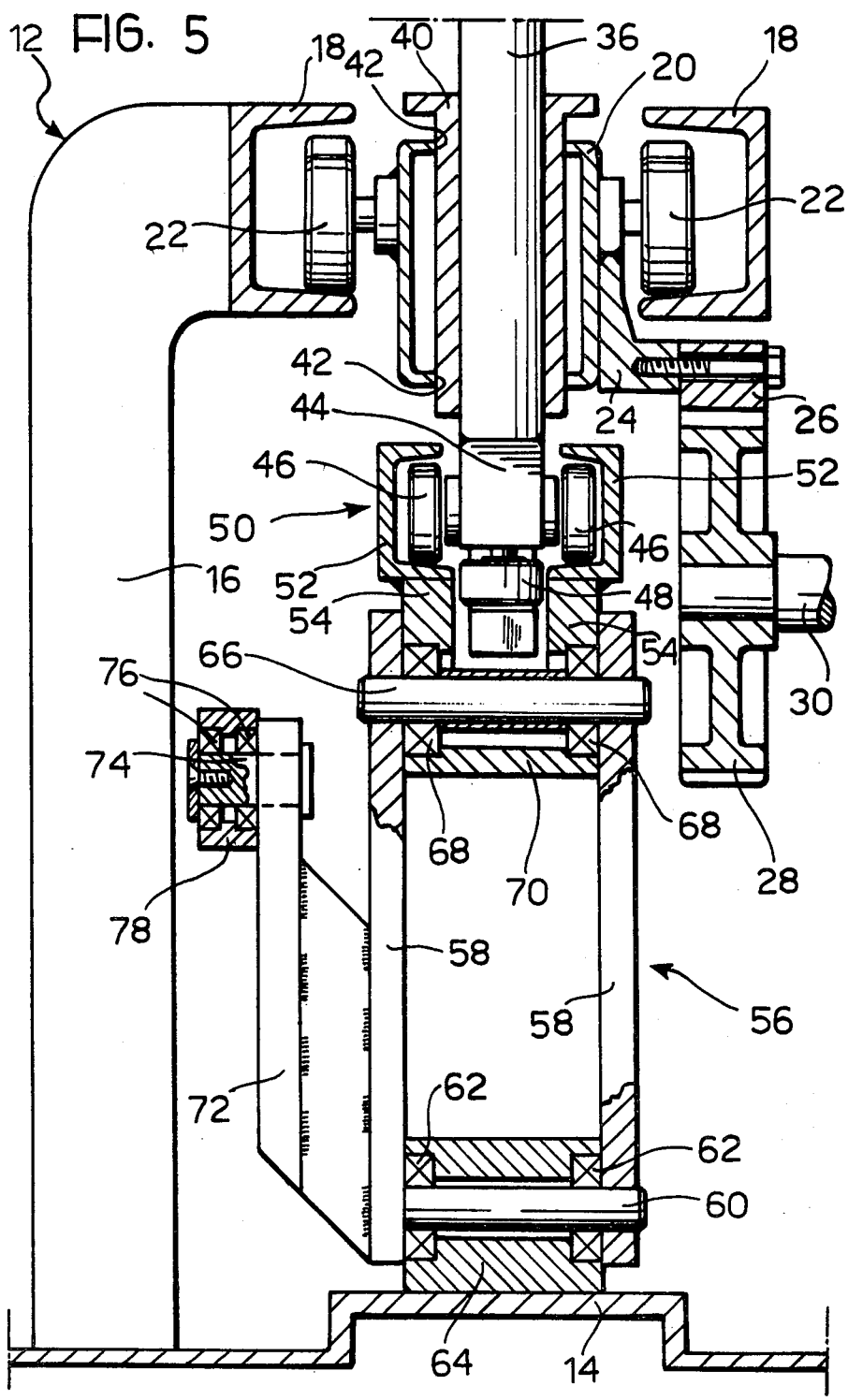
Figure 6:
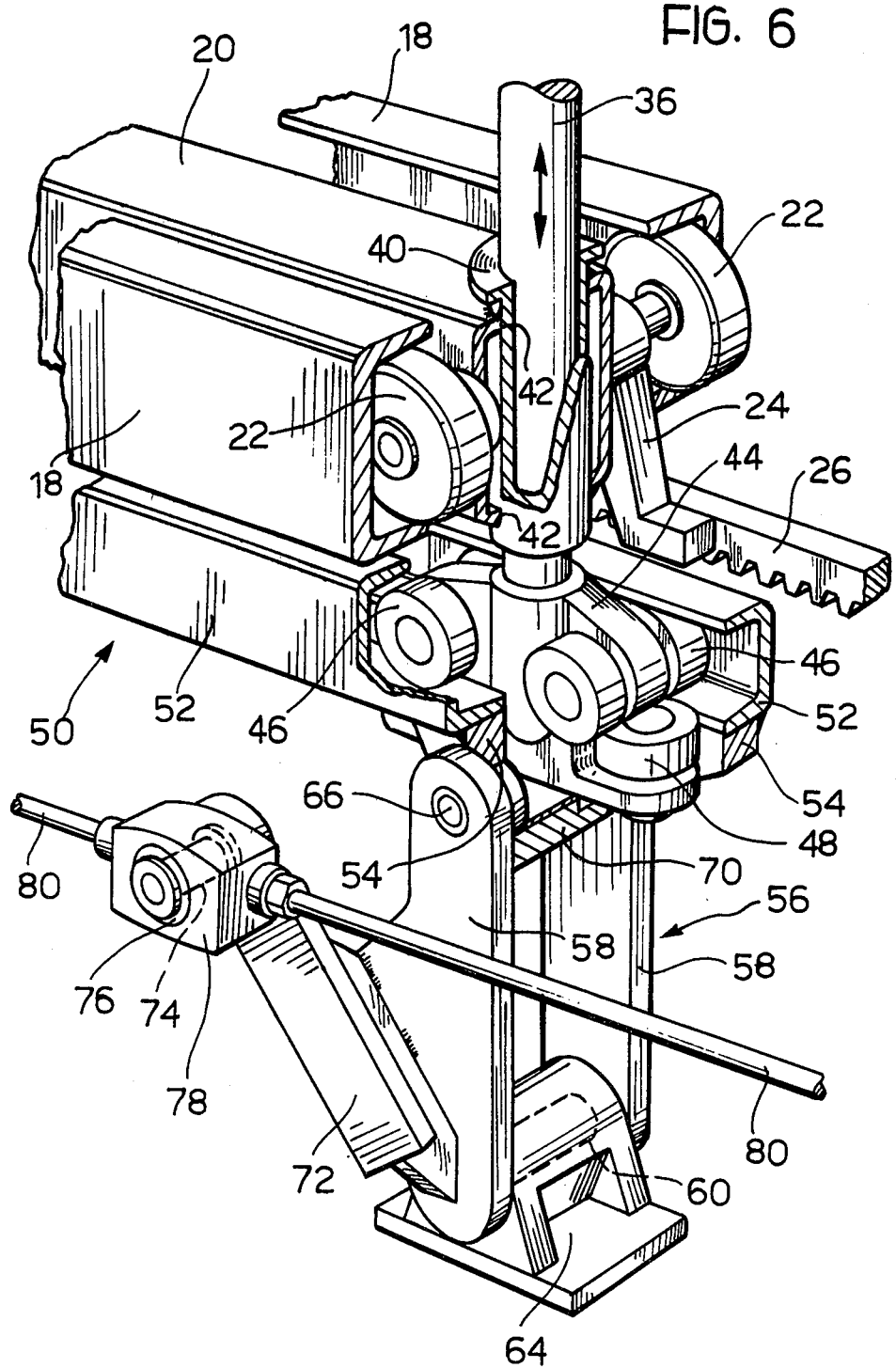

Further characteristics and advantages of the invention will become apparent in the course of the detailed description which follows, with reference to the appended drawings supplied purely by way of non-limiting example, in which:

FIG. 1 is a diagrammatic side elevation of a conveyor installation according to the invention, shown in the first operative state, FIG. 2 is a view similar to FIG. 1 which shows the installation in a second operative state, FIG. 3 is a top plan view to an enlarged scale of part of FIG. 1, FIG. 4 is a cross-section to an enlarged scale taken on line IV—IV of FIG. 1, FIG. 5 is a cross-section to an enlarged scale taken on line V—V in FIG. 1, and FIG. 6 is a perspective view of FIG. 5.

Referring first to FIG. 1, by 10 is shown in its entirety a component assembly line, for motor vehicle bodies for example, comprising a series of consecutive stations which are spaced from one another, three of these stations being diagrammatically indicated by $S_1$, $S_2$ and $S_3$. The work stations are fixed and supported overhead by fixtures, which are not shown in the drawings for reasons of clarity, which perform the various consecutive work operations.

Two support structures indicated by 12 extend adjacent and parallel to the two sides of the line 10. Each structure 12 is formed by a U-profiled frame with a horizontal base wall 14 and two vertical side walls 16. The upper ends of the side walls 16 are turned horizontally inwardly of the frame 12 and carry a pair of channel-section main guide rails 18.

Two horizontal translator bars are indicated by 20 and extend longitudinally intermediate the two main guide rails 18 carried on the frame 12. Each translator bar 20 has a length equal to that of the line 10, or equal to the sum of the steps between the consecutive work stations, and is formed by a tubular profiled piece of substantially quadrangular section. Each bar 20 is provided with a plurality of spaced lateral rollers 22 engaged in the main guide rails 18 and also supports, by means of a connecting brackets 24, a horizontally-disposed rack 26 positioned below the inner guide rail 18. The toothing of the rack 26 faces downwards and meshes with a toothed pinion 28 keyed onto the outer end of a transverse shaft 30 which extends through the inner side wall 16 of the frame 12 and is rotatably supported thereby in bearings 32. Each of the shafts 30 is driven by a single geared motor unit 34 in such a manner that translatory movement of the two bars 20 is effected as a to and from displacement. The amplitude of the forward stroke and of the return stroke of the two bars 20 is equal to the value of the spacing between each pair of successive work stations.

Associated with the two translator bars 20 is a plurality of support units equal in number to that of the line stations 10 and spaced from one another by a distance corresponding to the spacing between the stations themselves. Each support unit comprises two pairs of vertical columns 36 disposed at the vertices of a quadrilateral, with the two columns 36 arranged on the same side of the line 10 being supported by the corresponding translator bar 20 and having their upper ends interconnected by a dismountable longitudinal bearing bar 38. In fact, as clearly shown in FIGS. 5 and 6, each support column 36 is mounted for axial sliding through a vertical guide bush 40 which in its turn passes through a pair of aligned holes 42 formed respectively in the upper wall and lower wall of the bar 20. The lower end of the column 36 is therefore situated below the bar 20 and has an end part in the form of a trolley 44 which at its front and rear is provided with two pairs of upper guide rollers 46 with horizontal axes and two counter rollers 48 with vertical axes.

Extending under each translator bar 20 is a profiled longitudinal structure 50 which in its upper region defines two mutually-facing, channel-section, secondary guide rails 52 on which the lateral guide rollers 46 of the trolleys 44 rest. The rails 52 in their lower region are also provided with side walls 54 with which the counter rollers 48 of the trolleys 44 cooperate.

Each of the longitudinal guide structures 50 is supported by a plurality of spaced crank arms 56 by means of which the structure 50 may be raised or lowered with respect to the translator bars 20. Still referring to FIGS. 5 and 6, each of the crank arms 56 is formed by a pair of parallel plates 58 whose lower ends are articulated, by means of a horizontal pivot 60 extending transversely to the line 10 and with the interposition of bearings 62, to a support member 64 fixed to the base wall 14 of the frame 12. The upper ends of the two plates 58 carry a pivot 66, parallel to the pivot 60, on which a support 70 is mounted with the interposition of bearings 68. The support 70 is rigid with the lower walls 54 of the guide structure 50. The outer plate 58 of each arm 56 also has an outer lug 72 which carries a third articulating pivot 74, parallel to the pivots 60 and 66. Mounted on the pivot 74 with the interposition of bearings 76, is a connecting member 78 at the end of which are connected two longitudinal control rods 80. The rods 80 extend between each pair of adjacent arms 56, so that all the arms 56 which are arranged respectively along one side and along the other side of the line 10 are interconnected.

At the input end of the line 10, the two rods 80 are associated with a pair of synchronously controlled hydraulic actuators 82 for effecting angular displacement of the arms 56 between the position shown in FIG. 1 and the position illustrated in FIG. 2. In the first instance, which corresponds to the hydraulic actuators 82 being in a contracted state, the arms 56 are disposed in a raised position in which the axes of the pivots 60 and 66 are contained in a substantially vertical plane. This raised position of the arms 56 corresponds to a raised position of the guide structures 50, and hence of the columns 36, relative to the translator bars 20.

In the second instance, which corresponds to the hydraulic actuators 82 being in an extended state, the arms 56 are in a lowered position in which the axes of the pivots 60 and 66 are substantially contained in a horizontal plane. In this condition the guide structures 50, and hence the support columns 36, are in a lowered position relative to the translator bars 20.

The operation of the conveyor installation according to the invention is as follows.

The components for assembly, which in the example illustrated consist of motor vehicle bodies shown as $A_1$, $A_2$, $A_3$, are loaded onto the conveyor installation and are each deposited on a respective group of support columns 36. The translator bars 20, which are movable back and forth by the reduction gear unit 34, enable the bodies $A_1$, $A_2$, $A_3$—to be displaced along the line of operation 10, so that they are successively transferred to the various work stations $S_1$, $S_2$, $S_3$—Supposing therefore that one starts from the position illustrated in FIG. 1, where the hydraulic actuators 82 are contracted and the columns 36 are in a raised position, the forward stroke of the bars 20 is controlled so that the body $A_1$, previously positioned in correspondence with the station $S_1$, is disposed in correspondence with the following station $S_2$, the body $A_2$, previously at the station $S_2$ is carried to the following station $S_3$, and so on. A further body $A_4$ is then placed on the support columns 36 at the first station $S_1$.

At this point the hydraulic actuators 82 are extended so as to carry the arms 56 and thus the guide structures 50 and the support columns 36 of each group, into the lowered position shown in FIG. 2. The bodies are thus deposited at the various stations, coming off their respective support columns 36, and various operations are then carried out at the stations, while at the same time the return stroke of the translator bar 20 is effected to return the bars to their initial position. At the end of the working operations, contraction of the hydraulic jacks 82 is effected which causes raising of the arms 56 and hence of the guide structures 50 and of the support columns 36 of each group, in such a manner that the bodies are lifted off and removed from the equipment at the work stations. At this point another forward movement of the bars 20 is effected so that each body is carried to the successive station, repeating the cycle described above.

I claim:

1. A conveyor installation for displacing components along an assembly line which includes a series of spaced work stations, said installation comprising:
    a fixed mounting structure,
    a pair of horizontal translator bars moveably mounted in said fixed structure and extending longitudinally along the assembly line for the purpose of transporting said components between the work stations,
    first actuator means for effecting joint reciprocal movement of the translator bars parallel to the said assembly line with a forward and return stroke equal to the interval between each pair of adjacent said work stations, whereby to horizontally transfer each said component from the region of one said station to the next, and
    means for setting down and taking up the components transported by the bars, at and from the work stations respectively at the end of and prior to, said forward stroke of the translator bars, said means comprising:
    a series of spaced support means carried on said two translator bars and moveable relative thereto, and therefore relative to the work stations, between raised positions in which the components are carried by said support means up off the work stations and lowered positions in which the components are set down at the work stations, and
    second actuator means for effecting the simultaneous displacement of said support means between their lowered and raised positions, said second actuator means being arranged to raise said support means prior to a said forward stroke of the transporter bars whereby to take up the components from the work stations in preparation for their movement by the bars to the next stations, and to lower said support means at the end of said forward stroke whereby to set down the components at said next stations, and
    wherein said translator bars are provided with vertical guide passages and the said support means are formed by vertical columns mounted for axial sliding between said raised and lowered positions in corresponding ones of said guide passages, the installation further comprising, beneath the said translator bars, two horizontal, vertically-moveable, support and guide structures in which the lower ends of the said columns slidingly engage and on which the said second actuator means operate, and
    wherein each of the said columns is provided at its lower end with a trolley incorporating horizontal-axis guide rollers and vertical-axis counter rollers cooperating with the said support and guide structures.

2. An installation according to claim 1, wherein said second actuator means comprise:
    a plurality of crank arms spaced along the two sides of the assembly line and pivoted in their lower regions to said fixed structure and in their upper regions to said support and guide structures around respective horizontal axes perpendicular to the direction of displacement of the said translator bars,
    two series of longitudinal rods which pivotally interconnect the said arms located on respective sides of the said assembly line, and
    drive means for effecting translatory movement of the said rods in such a manner as to cause simultaneous angular displacement of the said arms between a lowered position, which corresponds to a lowered position of said support and guide structures and of the support columns, and in which the said horizontal axes are contained in a substantially horizontal plane, and a raised position which corresponds to a raised position of the support and guide structures and of the support columns and in which the said horizontal axes are contained in a substantially vertical plane.

3. An installation according to claim 1, wherein each said support means comprises four said columns disposed at the vertices of a notional quadrilateral with two columns being associated with each translator bar, the said support means further comprising two longitudinal bearing rods respectively interconnecting the upper ends of the two columns associated with each translator bar.

4. An installation according to claim 2, wherein the fixed mounting structure comprises along each side of the assembly line, a substantially U-profiled frame provided with substantially vertical side walls the upper ends of which are turned inwards towards each other, and a pair of longitudinal bearing and guide rails for the corresponding translator bar, said rails being supported by the inwardly-turned upper ends of the frame side walls, and the said crank arms and their associated rods being located between the frame side walls and being pivoted in their lower regions to the base wall of the frame.

5. An installation according to claim 4, wherein each said translator bar incorporates a series of lateral guide rollers which rest on the corresponding said longitudinal bearing and guide rails.

6. An installation according to claim 4, wherein each translator bar is provided with a longitudinal rack which is located between the side walls of the corresponding frame, said first actuator means including a respective toothed pinion cooperating with each rack and a reduction gear unit drivingly coupled to the pinions for effecting the back and forth displacement of the translator bars.

7. An installation according to claim 1, wherein each translator bar is formed from a tubular profiled piece of substantially quadrangular section.

* * * * *